(12) United States Patent
Sato

(10) Patent No.: US 10,501,608 B2
(45) Date of Patent: *Dec. 10, 2019

(54) RUBBER COMPOSITION FOR TIRE TREAD

(71) Applicant: The Yokohama Rubber Co., LTD., Minato-ku, Tokyo (JP)

(72) Inventor: Masaki Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 2 days.

This patent is subject to a terminal disclaimer.

(21) Appl. No.: 15/561,971

(22) PCT Filed: Mar. 26, 2015

(86) PCT No.: PCT/JP2015/059378
§ 371 (c)(1),
(2) Date: Sep. 26, 2017

(87) PCT Pub. No.: WO2016/151841
PCT Pub. Date: Sep. 29, 2016

(65) Prior Publication Data
US 2018/0127569 A1  May 10, 2018

(51) Int. Cl.
| | | |
|---|---|---|
| *C08L 9/00* | (2006.01) | |
| *C08J 3/22* | (2006.01) | |
| *C08J 9/32* | (2006.01) | |
| *C08L 7/00* | (2006.01) | |
| *C08L 83/04* | (2006.01) | |
| *C08J 9/00* | (2006.01) | |
| *B60C 1/00* | (2006.01) | |
| *B60C 11/00* | (2006.01) | |
| *C08K 5/14* | (2006.01) | |
| *C08K 9/10* | (2006.01) | |
| *C08L 15/00* | (2006.01) | |
| *C08K 3/36* | (2006.01) | |

(52) U.S. Cl.
CPC ............... *C08L 9/00* (2013.01); *B60C 1/00* (2013.01); *B60C 1/0016* (2013.01); *B60C 11/0008* (2013.01); *C08J 3/22* (2013.01); *C08J 3/226* (2013.01); *C08J 9/0061* (2013.01); *C08J 9/32* (2013.01); *C08K 3/36* (2013.01); *C08K 5/14* (2013.01); *C08K 9/10* (2013.01); *C08L 7/00* (2013.01); *C08L 15/00* (2013.01); *C08L 83/04* (2013.01); *C08J 2201/024* (2013.01); *C08J 2201/026* (2013.01); *C08J 2203/22* (2013.01); *C08J 2307/00* (2013.01); *C08J 2309/00* (2013.01); *C08J 2383/04* (2013.01); *C08J 2483/04* (2013.01)

(58) Field of Classification Search
CPC .... C08L 9/00; C08L 7/00; C08L 15/00; C08L 83/04; C08J 3/22; C08J 3/226; C08J 9/0061; C08J 9/32; C08K 5/14; C08K 9/10
USPC ........................................................... 523/211
See application file for complete search history.

(56) References Cited

U.S. PATENT DOCUMENTS

| | | | | |
|---|---|---|---|---|
| 6,177,506 B1 * | 1/2001 | Takahashi | ................ | C08K 3/36 |
| | | | | 264/210.6 |
| 10,086,652 B2 * | 10/2018 | Mihara | .................... | C08L 91/00 |
| 2002/0026003 A1 | 2/2002 | Rubber | | |
| 2002/0177650 A1 | 11/2002 | Mori et al. | | |
| 2006/0148979 A1 | 7/2006 | Mori et al. | | |
| 2010/0152368 A1 * | 6/2010 | Hirayama | ............... | C08L 21/00 |
| | | | | 524/570 |
| 2013/0150512 A1 | 6/2013 | Rubber | | |
| 2014/0051788 A1 * | 2/2014 | Suzuki | ................... | C08K 5/544 |
| | | | | 524/262 |

FOREIGN PATENT DOCUMENTS

| | | |
|---|---|---|
| JP | 2000-026656 | 1/2000 |
| JP | 2002-047378 | 2/2002 |
| JP | 2002-114869 | 4/2002 |
| JP | 2002-356584 | 12/2002 |
| JP | 2003-105138 | 4/2003 |
| JP | 2004-035725 | 2/2004 |
| JP | 2004-210931 | 7/2004 |
| JP | 4046678 | 2/2008 |
| JP | 2012 131920 | 7/2012 |
| JP | 2014-185339 | 10/2014 |
| WO | WO 2005/035646 | 4/2005 |
| WO | WO 2012/023607 | 2/2012 |

OTHER PUBLICATIONS

Machine Translation of JP 2004-035725 (Year: 2004).*
International Search Report for International Application No. PCT/JP2015/059378 dated Jun. 30, 2015, 4 pages, Japan.

* cited by examiner

*Primary Examiner* — Hannah J Pak
(74) *Attorney, Agent, or Firm* — Thorpe North & Western

(57) ABSTRACT

Provided is a rubber composition for tire treads containing a diene rubber, from 1 to 20 parts by weight of a silica containing millable silicone rubber compound, and from 0.2 to 20 parts by weight of thermally expandable microcapsules, per 100 parts by weight of the diene rubber. A rubber hardness of the millable silicone rubber compound is from 10 to 50.

13 Claims, 1 Drawing Sheet

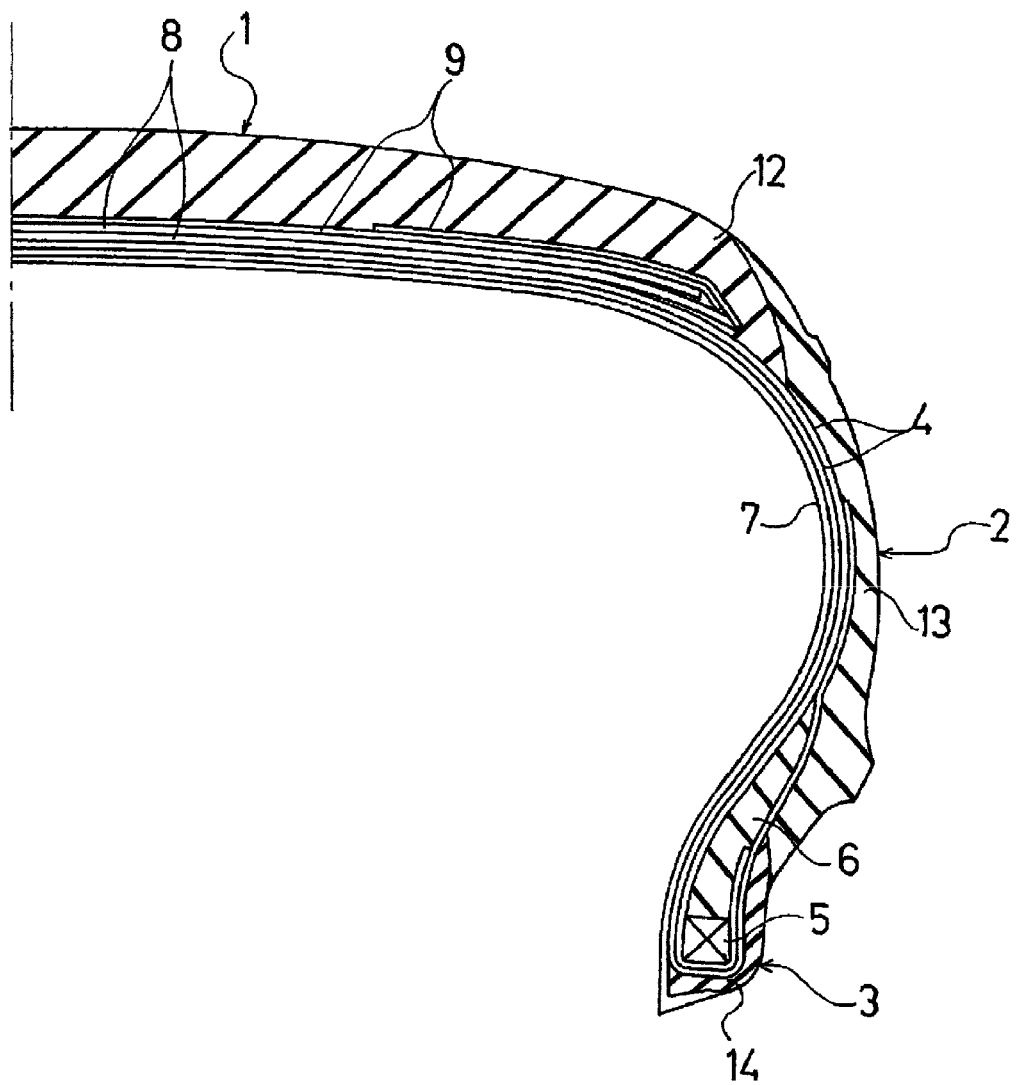

RUBBER COMPOSITION FOR TIRE TREAD

TECHNICAL FIELD

The present technology relates to a rubber composition for tire treads, the rubber composition containing thermally expandable microcapsules and enhancing friction performance on ice beyond conventional levels.

BACKGROUND ART

As a structure of a pneumatic tire for use on icy and snowy roads (studless tire), enhancement of performance on ice by repeating procedure including forming a plurality of air bubbles in a tread rubber, allowing these air bubbles to absorb and take up the water membrane on an icy surface when the tread comes into contact with the icy surface, and then removing the absorbed water by centrifugal force when the tread leaves the icy surface has been known.

Japanese Patent No. 4046678 proposes blending of thermally expandable microcapsules in a rubber composition for tire treads as a formation technique of such air bubbles. The thermally expandable microcapsules expand by heating during a vulcanization step of a pneumatic tire and form a plurality of air bubbles covered by microcapsule shells expanded in the tread rubber of the vulcanized tire (hollow particles).

However, in recent years, a higher level of performance on ice of studless tires has been demanded by consumers, and thus further enhancement in friction performance on ice has been required.

SUMMARY

The present technology provides a rubber composition for tire treads, the rubber composition containing thermally expandable microcapsules and enhancing friction performance on ice beyond conventional levels.

The rubber composition for tire treads of the present technology that achieves the object described above is a rubber composition containing a diene rubber, from 1 to 20 parts by weight of a millable silicone rubber compound and from 0.2 to 20 parts by weight of thermally expandable microcapsules, per 100 parts by weight of the diene rubber, the millable silicone rubber compound containing silica, and a rubber hardness of the millable silicone rubber compound being from 10 to 50.

The method of producing the rubber composition for tire treads of the present technology includes preparing a master batch by mixing a millable silicone rubber compound and thermally expandable microcapsules in advance and then mixing this master batch to the diene rubber.

Since the rubber composition for tire treads of the present technology contains both a millable silicone rubber compound and thermally expandable microcapsules, air bubbles obtained by expanding the thermally expandable microcapsules (shells of hollow particles) are formed in the tire ground contact surface containing the millable silicone rubber compound of the tread surface after vulcanization molding is performed. Since water repellency is imparted to the ground contact surface of the tire by the hydrophobic silicone rubber, water membrane on icy surface is readily absorbed by the air bubble when the tread comes into contact with the icy surface. As a result, water removal performance of the tread surface is enhanced, and friction performance on ice can be enhanced to or beyond conventional levels.

In the rubber composition for tire treads, the weight ratio (X/Y) of the compounded amount (X) of the millable silicone rubber compound to the compounded amount (Y) of the thermally expandable microcapsule is preferably from 20/80 to 90/10. Furthermore, a peroxide-based cross-linking agent is preferably contained since even higher friction performance on ice can be achieved.

The rubber hardness of the millable silicone rubber compound is preferably lower by 5 to 40 than the rubber hardness of a base rubber excluding the millable silicone rubber compound and the thermally expandable microcapsules from the rubber composition.

The method of producing the rubber composition for tire treads of the present technology can further enhance friction performance on ice since a master batch, in which the millable silicone rubber compound and the thermally expandable microcapsules are mixed, is mixed to the diene rubber. Furthermore, when the master batch is prepared, a peroxide-based cross-linking agent is more preferably contained.

A pneumatic tire using the rubber composition for tire treads of the present technology in the tread portion exhibits excellent performance as a studless tire and can further enhance friction performance on ice.

BRIEF DESCRIPTION OF DRAWING

FIG. 1 is a partial cross-sectional view in a tire meridian direction illustrating an example of an embodiment of a pneumatic tire in which a rubber composition for tire treads of the present technology is used.

DETAILED DESCRIPTION

FIG. 1 illustrates an example of an embodiment of a pneumatic tire in which a rubber composition for tire treads is used. The pneumatic tire includes a tread portion 1, sidewall portions 2, and bead portions 3.

In FIG. 1, two layers of carcass layers 4, formed by arranging reinforcing cords extending in a tire radial direction in a tire circumferential direction at a predetermined pitch and embedding these reinforcing cords in a rubber layer, are disposed extending between left and right side bead portions 3 of the pneumatic tire. Both ends are made to sandwich a bead filler 6 around a bead core 5 that is embedded in the bead portions 3 and are folded back in a tire axial direction from the inside to the outside. An innerliner layer 7 is disposed inward of the carcass layers 4. Two layers of belt layers 8, formed by arranging reinforcing cords extending inclined to the tire circumferential direction in the tire axial direction at a predetermined pitch and embedding these reinforcing cords in a rubber layer, are disposed on an outer circumferential side of the carcass layers 4 of the tread portion 1. The reinforcing cords of the two layers of belt layers 8 are inclined with respect to the tire circumferential direction, and the direction of the cords of the different layers have an opposite orientation and cross each other. A belt cover layer 9 is disposed outward of the belt layers 8. The tread portion 1 is formed from a tread rubber layer 12 on the outer circumferential side of the belt cover layer 9. The tread rubber layer 12 is preferably composed of the rubber composition for tire treads of the present application. A side rubber layer 13 is disposed outward of the carcass layers 4 in each sidewall portion 2, and a rim cushion rubber layer 14 is provided outward of the portion of each carcass layer 4 that is folded back around the bead portion 3. Note that a studless tire is not limited to an embodiment of the pneumatic tire illustrated in FIG. 1 as an example.

In the present technology, the used diene rubber needs to be a diene rubber that typically constitutes a tread portion of a studless tire. Examples thereof include natural rubbers, isoprene rubbers, butadiene rubbers, various styrene butadiene rubbers, butyl rubbers, and ethylene-propylene-diene rubbers. Among these, natural rubbers, butadiene rubbers, and styrene butadiene rubbers are preferred, and more preferably, the diene rubber is formed from a natural rubber and/or a butadiene rubber. By allowing the natural rubber and/or the butadiene rubber to be contained, higher friction performance on ice can be achieved when a pneumatic tire is produced.

In the present technology, the average glass transition temperature of the diene rubber described above is preferably −50° C. or lower, and more preferably from −60 to −100° C. By setting the average glass transition temperature of the diene rubber to −50° C. or lower, flexibility of the rubber compound is maintained at low temperatures and high adhesion force to icy surfaces can be achieved, and thus the diene rubber can be suitably used in the tread portion of a winter tire. Note that, for the glass transition temperature, a thermogram is obtained by differential scanning calorimetry (DSC) at a rate of temperature increase of 20° C./min and the temperature at the midpoint of the transition region is defined as the glass transition temperature. When the diene rubber is an oil extended product, the glass transition temperature is the glass transition temperature of the diene rubber containing no oil-extending component (the oil). Furthermore, the average glass transition temperature is determined by multiplying weight fractions of diene rubbers by corresponding glass transition temperatures of the diene rubbers and then summing up the obtained values (weighted average value of the glass transition temperatures). The total weight ratio of all of the diene rubbers is set to 1.

In the vulcanized rubber composition of the present technology, from 0.2 to 20 parts by weight, and preferably from 1.0 to 18 parts by weight, of thermally expandable microcapsules are blended per 100 parts by weight of the diene rubber described above. When the compounded amount of the thermally expandable microcapsules is less than 0.2 parts by weight, the volume of hollow particles (microcapsule shells) in which the thermally expandable microcapsules expand at the time of vulcanization is insufficient, which makes it impossible to sufficiently improve the frictional performance on ice. When the compounded amount of the thermally expandable microcapsules exceeds 20 parts by weight, the wear resistance performance of the tread rubber may be diminished.

The thermally expandable microcapsules have a structure in which a thermally expandable substance is encapsulated in a shell material formed from a thermoplastic resin. Therefore, when the microcapsules dispersed in the rubber composition are heated at the time of the vulcanization molding of an unvulcanized tire, the thermally expandable substance encapsulated in the shell material expands so as to increase the particle size of the shell material and to form multiple hollow particles in the tread rubber. As a result, a water membrane formed on the surface of ice is effectively absorbed and removed, and a micro-edge effect is achieved, so the performance on ice is improved. The shell material of the microcapsules is harder than the tread rubber and can therefore enhance the wear resistance of the tread portion. The shell material of the thermally expandable microcapsules can be formed from a nitrile-based polymer.

The thermally expandable substance encapsulated in the shell material of the microcapsules has the property of vaporizing or expanding due to heat, and an example thereof is at least one type selected from the group consisting of hydrocarbons such as normal alkanes and isoalkanes. Examples of the isoalkanes include isobutane, isopentane, 2-methylpentane, 2-methylhexane, and 2,2,4-trimethylpentane, and examples of normal alkanes include n-butane, n-propane, n-hexane, n-heptane, and n-octane. These hydrocarbons may each be used alone, or a plurality thereof may be used in combination. As a preferred form of a thermally expandable substance, a substance in which a hydrocarbon which is a gas at normal temperature is dissolved in a hydrocarbon which is a liquid at normal temperature may be used. By using a mixture of such hydrocarbons, it is possible to achieve sufficient expansion force from a low temperature region to a high temperature region within the vulcanization molding temperature region (150 to 190° C.) of an unvulcanized tire.

In the rubber composition for tire treads of the present technology, a millable silicone rubber compound is blended together with the thermally expandable microcapsules described above. As a result, water repellency is imparted to the ground contact surface of the tire tread, water repelled by this is readily absorbed by air bubbles (microcapsule shells), and high friction performance on ice can be achieved.

The millable silicone rubber compound is a compound containing a millable silicone rubber and silica. Furthermore, the millable silicone rubber is a silicone rubber other than liquid silicone rubber, that has plasticity, and that cures when being blended with a cross-linking agent and heated. Although the weight average molecular weight of the millable silicone rubber is not particularly limited as long as the silicone rubber has plasticity, the weight average molecular weight is preferably from 400000 to 900000, and more preferably from 450000 to 850000. In the present specification, the weight average molecular weight of the millable silicone rubber is measured by GPC, and the weight average molecular weight was determined based on calibration with polystyrene standard.

By blending silica and other reinforcing filler except the silica, dispersant, stabilizer, and/or other compounding agents to the millable silicone rubber, appropriate rubber strength and rubber hardness can be imparted to the millable silicone rubber compound.

The compounded amount of the millable silicone rubber compound is from 1 to 20 parts by weight, preferably from 2 to 20 parts by weight, and more preferably from 2 to 18 parts by weight, per 100 parts by weight of the diene rubber. When the compounded amount of the millable silicone rubber compound is less than 1 part by weight, sufficient water repellency cannot be imparted to the rubber composition for tire treads. Furthermore, when the compounded amount of the millable silicone rubber compound is greater than 20 parts by weight, rubber strength of the rubber composition deteriorates and wear resistance deteriorates.

Furthermore, the weight ratio (X/Y) of the compounded amount (X) of the millable silicone rubber compound to the compounded amount (Y) of the thermally expandable microcapsule is from 20/80 to 90/10, and preferably from 30/70 to 85/15. When the weight ratio (X/Y) is less than 20/80, effect on performance on ice decreases since water repellent effect is too small relative to the number of the air bubbles (shells of hollow particles). When the weight ratio (X/Y) is greater than 90/10, it becomes difficult for the air bubbles to absorb water membrane since water repellent effect is too intense for the air bubbles (shells of hollow particles).

The rubber hardness of the millable silicone rubber compound is preferably from 10 to 50, and more preferably from 15 to 45. Various additives that are typically used for the millable silicone rubber compound can be blended.

The rubber hardness of the millable silicone rubber compound is preferably lower than the rubber hardness of the base rubber of the rubber composition. That is, the base rubber is a rubber composition excluding the millable silicone rubber compound and the thermally expandable microcapsules from the rubber composition for tire treads of the present technology. The rubber hardness of the millable silicone rubber compound is preferably lower than the rubber hardness of the base rubber, and the rubber hardness of the millable silicone rubber compound is more preferably lower by 5 to 40 than the rubber hardness of the base rubber. As a result, followability to the road surface is enhanced, and water repellency is more easily exhibited.

The rubber composition for tire treads of the present technology preferably contains a peroxide vulcanizing agent. By blending the peroxide vulcanizing agent, even higher friction performance on ice can be achieved. The compounded amount of the peroxide vulcanizing agent is preferably from 0.5 to 5.0 wt. %, and more preferably from 1.0 to 4.5 wt. %, relative to the weight of the millable silicone rubber. When the compounded amount of the peroxide vulcanizing agent is less than 0.5 wt. %, effect of the peroxide vulcanizing agent cannot be achieved sufficiently. When the compounded amount of the peroxide vulcanizing agent is greater than 5.0 wt. %, the rubber composition for tire treads becomes brittle and wear resistance is deteriorated.

The method of producing the rubber composition for tire treads described above may be performed in the same manner as in production of the rubber composition to which the thermally expandable microcapsules are blended. That is, the rubber composition for tire treads can be prepared by preparing a kneaded product in which compounding agents except the thermally expandable microcapsules and the vulcanization compounding agents are mixed and kneaded with diene rubber, cooling the kneaded product to lower the temperature, and then blending the thermally expandable microcapsules and the vulcanization compounding agent thereto and mixing. Examples of the vulcanization compounding agent include vulcanizing agents, cross-linking agents, and vulcanization accelerators.

Furthermore, to produce the rubber composition for tire treads of the present technology even more effectively, preferably a master batch is prepared by mixing a millable silicone rubber compound and thermally expandable microcapsules in advance and then this master batch is mixed to the diene rubber. The vulcanization compounding agent may be mixed at the same time as mixing the master batch and the diene rubber or may be mixed thereafter.

When the master batch of the millable silicone rubber compound and the thermally expandable microcapsules is prepared, the weight ratio (X/Y) of the compounded amount (X) of the millable silicone rubber compound to the compounded amount (Y) of the thermally expandable microcapsule can be set as described above.

Furthermore, the peroxide vulcanizing agent can be blended to the master batch. As a result, strength of the silicone rubber is increased and even higher friction performance on ice can be achieved. The compounded amount of the peroxide vulcanizing agent can be set as described above.

The mixing conditions of the millable silicone rubber compound and the thermally expandable microcapsules are not particularly limited as long as breakage of the thermally expandable microcapsules is suppressed and thermal expansion does not occur. The temperature, rotational speed, and the like can be appropriately selected in a manner that the millable silicone rubber compound and the thermally expandable microcapsules are substantially uniformly mixed.

Kneading machines used in the mixing of the millable silicone rubber compound and the thermally expandable microcapsules are not particularly limited, and examples thereof include a Banbury mixer, a kneader, and a roll.

The rubber composition for tire treads may contain a filler such as silica and carbon black. By blending the filler, high rubber strength can be achieved, thereby making wear resistance performance excellent. The compounded amount of the filler is preferably from 10 to 100 parts by weight, and more preferably from 20 to 90 parts by weight, per 100 parts by weight of the diene rubber. When the compounded amount of the filler is less than 10 parts by weight, the wear resistance performance cannot be enhanced by increasing the rubber strength. When the compounded amount of the filler is greater than 100 parts by weight, rolling resistance of the rubber composition for tire treads deteriorates.

When silica is blended to the vulcanized rubber composition of the present technology, a silane coupling agent may be blended. By compounding a silane coupling agent, it is possible to improve the dispersibility of the silica in the diene rubber and to increase the reinforcing property with the rubber.

The compounded amount of the silane coupling agent is preferably from 3 to 15 wt. %, and more preferably from 5 to 10 wt. %, relative to the compounded amount of the silica in the vulcanized rubber composition. When the compounded amount of the silane coupling agent is less than 3 wt. %, it is not possible to sufficiently improve the dispersion of the silica. When the compounded amount of the silane coupling agent is greater than 15 wt. % of the compounded amount of the silica, silane coupling agent condenses with one another, and thus desired effects cannot be achieved.

The type of the silane coupling agent is not particularly limited as long as the silane coupling agent can be used in a rubber composition having silica blended therein. Examples thereof include sulfur-containing silane coupling agents, such as bis-(3-triethoxysilylpropyl)tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

As the filler except the silica and the carbon black, any fillers that can be used in pneumatic tires can be used. Examples thereof include calcium carbonate, magnesium carbonate, talc, clay, alumina, aluminum hydroxide, titanium oxide, and calcium sulfate.

Additives can be kneaded by any commonly known method to form an unvulcanized rubber composition, which can be used for vulcanizing or crosslinking. The compounded amount of these additives may be any conventional amount as long as the object of the present technology is not impaired. Such a rubber composition can be produced by mixing the components described above using a publicly known rubber kneading machine, such as a Banbury mixer, a kneader, or a roll.

The rubber composition for tire treads of the present technology is suitable for constituting a tread portion of a studless tire. With the tread portion formed as described above, performance on ice can be enhanced to or beyond conventional levels.

The present technology is further described below by examples. However, the scope of the present technology is not limited to these examples.

EXAMPLES

Examples 1 to 7 and Comparative Examples 1 to 6, 10, and 11

Using the diene rubber, the fillers, and the compounding agents shown in Table 5 as common components, as 15 types of rubber compositions having compositions shown in Tables 1 and 2 (Examples 1 to 7 and Comparative Examples 1 to 6, 10, and 11), unvulcanized rubber compositions were prepared by kneading components, except the sulfur, the vulcanization accelerator, the thermally expandable microcapsules, and the silicone rubber compound, in a 1.8 L sealed mixer for 5 minutes, discharging and cooling, adding the sulfur, the vulcanization accelerator, the thermally expandable microcapsules, and the silicone rubber compound, and mixing by an open roll. Note that the compounded amounts of the compounding agents shown in Tables 1 and 2 are expressed as values in parts by weight per 100 parts by weight of the diene rubbers shown in Table 5.

Examples 8 to 20 and Comparative Examples 7 to 9 and 12 to 14

Nineteen types of the master batches (MB-1 to 19) shown in Tables 1, 3, and 4 were prepared. Components were weighed according to the compounding ratio shown in the rows of details of each master batch proportion, and the weighed materials were mixed by using a 1.8 L sealed Banbury mixer at 100° C. or lower for 2.5 minutes to prepare 19 types of the master batches.

Using the diene rubber, the fillers, and the compounding agents shown in Table 5 as common components, as 19 types of rubber compositions having compositions shown in Tables 1, 3, and 4 (Examples 8 to 20 and Comparative Examples 7 to 9 and 12 to 14), unvulcanized rubber compositions were prepared by kneading the components excluding the master batch, the sulfur, and the vulcanization accelerator in a 1.8 L sealed mixer for 5 minutes, discharging and cooling the mixture, adding the master batch, the sulfur, and the vulcanization accelerator to the mixture, and mixing with an open roll. Note that the compounded amounts of the compounding agents shown in Tables 1, 3, and 4 are expressed as values in parts by weight per 100 parts by weight of the diene rubbers shown in Table 5.

The obtained 44 types of rubber compositions were press-vulcanized at 170° C. for 10 minutes in a predetermined mold to produce vulcanized rubber test pieces formed from the rubber compositions for tire treads. The friction performances on ice of the obtained vulcanized rubber test pieces were evaluated by the method described below.

Friction Performance on Ice

The obtained vulcanized rubber test piece was bonded to a substrate rubber in the form of a flat column and the coefficient of friction on ice was determined by an inside drum-type friction on ice tester under conditions of a measurement temperature of −1.5° C., a load of 5.5 kg/cm$^3$, and a drum rotation speed of 25 km/h. The obtained coefficient of friction on ice was shown in the "friction performance on ice" rows of Tables 1 to 4 with the value of Comparative Example 1 expressed as an index of 100. A larger index value indicates greater frictional force on ice and better friction performance on ice.

For the rubber composition with the common components formed from the diene rubber, the fillers, and the compounding agents shown in Table 5, an unvulcanized base rubber composition was prepared by kneading the components excluding the sulfur and the vulcanization accelerator in a 1.8 L sealed mixer for 5 minutes, discharging and cooling the mixture, adding the sulfur and the vulcanization accelerator to the mixture, and mixing with an open roll. The obtained rubber composition of the base rubber was press-vulcanized at 170° C. for 10 minutes in a predetermined mold to produce a vulcanized rubber test piece.

The rubber hardness of the vulcanized rubber test piece of the base rubber was measured in accordance with JIS K6253 using a type A durometer at a temperature of 23° C., and the rubber hardness was 50.

TABLE 1

|  |  | Comparative Example 1 | Comparative Example 2 | Comparative Example 3 |
|---|---|---|---|---|
| Microcapsules | parts by weight | 5 | 5 | 5 |
| Silicone rubber compound 1 | parts by weight |  | 0.5 | 25 |
| Silicone rubber compound 2 | parts by weight |  |  |  |
| Silicone rubber compound 3 | parts by weight |  |  |  |
| Silicone rubber compound 4 | parts by weight |  |  |  |
| Peroxide-based cross-linking agent | parts by weight |  |  |  |
| Master batch | Type (name of master batch) |  |  |  |
|  | Compounded amount relative to diene rubber amount | parts by weight |  |  |
|  | Details of the compounded amount above |  |  |  |

TABLE 1-continued

|  |  |  |  |  |  |
|---|---|---|---|---|---|
|  | Microcapsules | (parts by weight) |  |  |  |
|  | Silicone rubber compound 1 | (parts by weight) |  |  |  |
|  | Silicone rubber compound 2 | (parts by weight) |  |  |  |
|  | Silicone rubber compound 3 | (parts by weight) |  |  |  |
|  | Silicone rubber compound 4 | (parts by weight) |  |  |  |
|  | Peroxide-based cross-linking agent | (parts by weight) |  |  |  |
| Frictional force on ice | Index value | 100 | 101 | 98 |  |

|  |  |  | Comparative Example 4 | Comparative Example 5 | Comparative Example 6 |
|---|---|---|---|---|---|
| Microcapsules |  | parts by weight |  |  |  |
| Silicone rubber compound 1 |  | parts by weight | 16 |  |  |
| Silicone rubber compound 2 |  | parts by weight |  | 16 | 16 |
| Silicone rubber compound 3 |  | parts by weight |  |  |  |
| Silicone rubber compound 4 |  | parts by weight |  |  |  |
| Peroxide-based cross-linking agent |  | parts by weight |  |  | 0.32 |
| Master batch | Type (name of master batch) |  |  |  |  |
|  | Compounded amount relative to diene rubber amount | parts by weight |  |  |  |
|  | Details of the compounded amount above |  |  |  |  |
|  | Microcapsules | (parts by weight) |  |  |  |
|  | Silicone rubber compound 1 | (parts by weight) |  |  |  |
|  | Silicone rubber compound 2 | (parts by weight) |  |  |  |
|  | Silicone rubber compound 3 | (parts by weight) |  |  |  |
|  | Silicone rubber compound 4 | (parts by weight) |  |  |  |
|  | Peroxide-based cross-linking agent | (parts by weight) |  |  |  |
| Frictional force on ice | Index value | 90 | 92 | 93 |  |

|  |  |  | Comparative Example 7 | Comparative Example 8 | Comparative Example 9 |
|---|---|---|---|---|---|
| Microcapsules |  | parts by weight |  |  |  |
| Silicone rubber compound 1 |  | parts by weight |  |  |  |
| Silicone rubber compound 2 |  | parts by weight |  |  |  |
| Silicone rubber compound 3 |  | parts by weight |  |  |  |
| Silicone rubber compound 4 |  | parts by weight |  |  |  |
| Peroxide-based cross-linking agent |  | parts by weight |  |  |  |
| Master batch | Type (name of master batch) |  | MB-1 | MB-2 | MB-3 |
|  | Compounded amount relative to diene rubber amount | parts by weight | 30 | 30.75 | 30.75 |
|  | Details of the compounded amount above |  |  |  |  |
|  | Microcapsules | (parts by weight) | (5) | (5) | (5) |
|  | Silicone rubber compound 1 | (parts by weight) | (25) | (25) |  |

TABLE 1-continued

|  |  | | | |
|---|---|---|---|---|
| Silicone rubber compound 2 | (parts by weight) |  |  | (25) |
| Silicone rubber compound 3 | (parts by weight) |  |  |  |
| Silicone rubber compound 4 | (parts by weight) |  |  |  |
| Peroxide-based cross-linking agent | (parts by weight) |  | (0.75) | (0.75) |
| Frictional force on ice | Index value | 101 | 102 | 100 |

TABLE 2

|  |  | Example 1 | Example 2 | Example 3 | Example 4 | Example 5 |
|---|---|---|---|---|---|---|
| Microcapsules | parts by weight | 5 | 5 | 5 | 5 | 5 |
| Silicone rubber compound 1 | parts by weight | 3 | 16 |  |  |  |
| Silicone rubber compound 2 | parts by weight |  |  | 3 | 16 |  |
| Silicone rubber compound 3 | parts by weight |  |  |  |  | 16 |
| Silicone rubber compound 4 | parts by weight |  |  |  |  |  |
| Peroxide-based cross-linking agent | parts by weight |  |  |  |  |  |
| Frictional force on ice | Index value | 112 | 120 | 115 | 126 | 116 |

|  |  | Comparative Example 10 | Example 6 | Example 7 | Comparative Example 11 |
|---|---|---|---|---|---|
| Microcapsules | parts by weight | 5 | 5 | 5 | 5 |
| Silicone rubber compound 1 | parts by weight |  |  |  |  |
| Silicone rubber compound 2 | parts by weight |  | 3 | 16 |  |
| Silicone rubber compound 3 | parts by weight |  |  |  |  |
| Silicone rubber compound 4 | parts by weight | 16 |  |  | 16 |
| Peroxide-based cross-linking agent | parts by weight |  | 0.06 | 0.32 | 0.32 |
| Frictional force on ice | Index value | 107 | 117 | 128 | 108 |

TABLE 3

|  |  |  | Example 8 | Example 9 | Example 10 | Example 11 |
|---|---|---|---|---|---|---|
| Master batch | Type (name of master batch) |  | MB-4 | MB-5 | MB-6 | MB-7 |
|  | Compounded amount relative to diene rubber amount | parts by weight | 8 | 21 | 8 | 21 |
|  | Details of the compounded amount above |  |  |  |  |  |
|  | Microcapsules | (parts by weight) | (5) | (5) | (5) | (5) |
|  | Silicone rubber compound 1 | (parts by weight) | (3) | (16) |  |  |
|  | Silicone rubber compound 2 | (parts by weight) |  |  | (3) | (16) |
|  | Silicone rubber compound 3 | (parts by weight) |  |  |  |  |
|  | Silicone rubber compound 4 | (parts by weight) |  |  |  |  |
|  | Peroxide-based cross-linking agent | (parts by weight) |  |  |  |  |
| Frictional force on ice | Index value |  | 117 | 126 | 121 | 133 |

|  |  |  | Example 12 | Example 13 | Example 14 | Comparative Example 12 |
|---|---|---|---|---|---|---|
| Master batch | Type (name of master batch) |  | MB-8 | MB-9 | MB-10 | MB-11 |
|  | Compounded amount relative to diene rubber amount | parts by weight | 4 | 26 | 21 | 21 |
|  | Details of the compounded amount above |  |  |  |  |  |
|  | Microcapsules | (parts by weight) | (2) | (10) | (5) | (5) |
|  | Silicone rubber compound 1 | (parts by weight) |  |  |  |  |
|  | Silicone rubber compound 2 | (parts by weight) | (2) | (16) |  |  |

TABLE 3-continued

|  |  |  |  |  |  |
|---|---|---|---|---|---|
| Silicone rubber compound 3 | (parts by weight) |  |  | (16) |  |
| Silicone rubber compound 4 | (parts by weight) |  |  |  | (16) |
| Peroxide-based cross-linking agent | (parts by weight) |  |  |  |  |
| Frictional force on ice | Index value | 104 | 140 | 120 | 109 |

TABLE 4

|  |  |  | Example 15 | Example 16 | Example 17 | Example 18 |
|---|---|---|---|---|---|---|
| Master batch | Type (name of master batch) |  | MB-12 | MB-13 | MB-14 | MB-15 |
|  | Compounded amount relative to diene rubber amount | parts by weight | 8 | 21.32 | 4.04 | 26.32 |
|  | Details of the compounded amount above |  |  |  |  |  |
|  | Microcapsules | (parts by weight) | (5) | (5) | (2) | (10) |
|  | Silicone rubber compound 1 | (parts by weight) |  |  |  |  |
|  | Silicone rubber compound 2 | (parts by weight) | (3) | (16) | (2) | (16) |
|  | Silicone rubber compound 3 | (parts by weight) |  |  |  |  |
|  | Silicone rubber compound 4 | (parts by weight) |  |  |  |  |
|  | Peroxide-based cross-linking agent | (parts by weight) | (0.06) | (0.32) | (0.04) | (0.32) |
| Frictional force on ice | Index value |  | 124 | 136 | 106 | 145 |

|  |  |  | Example 19 | Example 20 | Comparative Example 13 | Comparative Example 14 |
|---|---|---|---|---|---|---|
| Master batch | Type (name of master batch) |  | MB-16 | MB-17 | MB-18 | MB-19 |
|  | Compounded amount relative to diene rubber amount | parts by weight | 8.06 | 21.32 | 8.06 | 21.32 |
|  | Details of the compounded amount above |  |  |  |  |  |
|  | Microcapsules | (parts by weight) | (5) | (5) | (5) | (5) |
|  | Silicone rubber compound 1 | (parts by weight) |  |  |  |  |
|  | Silicone rubber compound 2 | (parts by weight) |  |  |  |  |
|  | Silicone rubber compound 3 | (parts by weight) | (3) | (16) |  |  |
|  | Silicone rubber compound 4 | (parts by weight) |  |  | (3) | (16) |
|  | Peroxide-based cross-linking agent | (parts by weight) | (0.06) | (0.32) | (0.06) | (0.32) |
| Frictional force on ice | Index value |  | 113 | 123 | 107 | 111 |

The types of raw materials used in Tables 1 to 4 are described below.

Microcapsule: Thermally expandable microcapsules, manufactured by Matsumoto Yushi-Seiyaku Co., Ltd. (Microsphere F100)

Silicone rubber compound 1: Compound containing a millable silicone rubber and silica; KE-500-U, manufactured by Shin-Etsu Chemical Co., Ltd.; when cured by heating using a peroxide vulcanizing agent, rubber hardness: 23, difference from the rubber hardness of the base rubber: 27

Silicone rubber compound 2: Compound containing a millable silicone rubber and silica; KE-922-U, manufactured by Shin-Etsu Chemical Co., Ltd.; when cured by heating using a peroxide vulcanizing agent, rubber hardness: 25, difference from the rubber hardness of the base rubber: 25

Silicone rubber compound 3: Compound containing a millable silicone rubber and silica; KE-941-U, manufactured by Shin-Etsu Chemical Co., Ltd.; when cured by heating using a peroxide vulcanizing agent, rubber hardness: 43, difference from the rubber hardness of the base rubber: 7

Silicone rubber compound 4: Compound containing a mill able silicone rubber and silica; KE-961-U, manufactured by Shin-Etsu Chemical Co., Ltd.; when cured by heating using a peroxide vulcanizing agent, rubber hardness: 63, difference from the rubber hardness of the base rubber: −13

Peroxide vulcanizing agent: C-8, manufactured by Shin-Etsu Chemical Co., Ltd.; product containing approximately 25% of 2,5-dimethyl-2,5-di(t-butylperoxy)hexane

TABLE 5

Common formulation of rubber compositions

| | |
|---|---|
| NR | 60 parts by weight |
| BR | 40 parts by weight |
| Carbon black | 50 parts by weight |
| Silica | 15 parts by weight |
| Silane coupling agent | 1.5 parts by weight |
| Oil | 30.0 parts by weight |
| Zinc oxide | 3.0 parts by weight |
| Stearic acid | 1.0 parts by weight |
| Anti-aging agent 1 | 1.5 parts by weight |
| Anti-aging agent 2 | 1.5 parts by weight |
| Sulfur | 1.5 parts by weight |
| Vulcanization accelerator | 1.5 parts by weight |

Note that the types of raw materials used in Table 5 are described below.
NR: Natural rubber; RSS #3
BR: Butadiene rubber; Nipol BR1220, manufactured by Zeon Corporation
Carbon black: SEAST 6, manufactured by Tokai Carbon Co., Ltd.
Silica: Nipsil AQ, manufactured by Japan Silica Industry Co., Ltd.
Silane coupling agent: Sulfur-containing silane coupling agent; Si69, manufactured by Degussa
Oil: Extract No. 4S, manufactured by Showa Shell Sekiyu K.K.
Zinc oxide: Zinc Oxide #3, manufactured by Seido Chemical Industry Co., Ltd.
Stearic acid: Beads stearic acid, manufactured by NOF Corporation
Anti-aging agent 1: 6PPD, manufactured by Flexsys
Anti-aging agent 2: NOCRAC 224, manufactured by Ouchi Shinko Chemical Industrial Co., Ltd.
Sulfur: "Golden Flower" oil-treated sulfur powder, manufactured by Tsurumi Chemical Industry, Co., Ltd.
Vulcanization accelerator: NOCCELER CZ-G, manufactured by Ouchi Shinko Chemical Industrial Co., Ltd.

As is clear from Tables 2 to 4, it was confirmed that the rubber compositions for tire treads of Examples 1 to 25 enhanced the friction performances on ice to or beyond conventional levels.

The rubber composition of Comparative Example 2 could not sufficiently improve the friction performance on ice since the compounded amount of the silicone compound 1 was less than 1 part by weight.

The rubber composition of Comparative Example 3 reduced its friction performance on ice since the compounded amount of the silicone compound 1 was greater than 20 parts by weight.

The rubber compositions of Comparative Examples 4 to 6 resulted in significantly deteriorated friction performance on ice since no thermally expandable microcapsules were contained.

The rubber compositions of Comparative Examples 7 to 9 could not sufficiently improve the friction performance on ice since the compounded amount of the silicone compound 1 or 2 was greater than 20 parts by weight.

The invention claimed is:

1. A rubber composition for a tire tread, wherein the rubber composition comprises: a diene rubber comprising natural rubbers and/or butadiene rubbers, from 1 to 20 parts by weight of a millable silicone rubber compound and from 0.2 to 20 parts by weight of a thermally expandable microcapsule having a structure in which a thermally expandable substance in encapsulated in a shell material formed from a thermoplastic resin, per 100 parts by weight of the diene rubber, the millable silicone rubber compound containing silica, and a rubber hardness of the millable silicone rubber compound being from 10 to 50.

2. The rubber composition for a tire tread according to claim 1, wherein a weight ratio (X/Y) of a compounded amount (X) of the millable silicone rubber compound to a compounded amount (Y) of the thermally expandable microcapsule is from 20/80 to 90/10.

3. The rubber composition for a tire tread according to claim 1, wherein the composition further comprises a peroxide-based cross-linking agent.

4. The rubber composition for a tire tread according to claim 1, wherein the rubber hardness of the millable silicone rubber compound is from 5 to 40 lower than a rubber hardness of a base rubber excluding the millable silicone rubber compound and the thermally expandable microcapsule from the rubber composition.

5. A method of producing the rubber composition for a tire tread described in claim 1, the method comprising: preparing a master batch by mixing the millable silicone rubber compound and the thermally expandable microcapsule in advance, and mixing the master batch and the diene rubber.

6. The method of producing the rubber composition for a tire tread according to claim 5, wherein the master batch further contains a peroxide-based cross-linking agent.

7. A studless tire comprising a tread portion formed from the rubber composition for a tire tread described in claim 1.

8. The rubber composition for a tire tread according to claim 2, further comprising a peroxide-based cross-linking agent.

9. The rubber composition for a tire tread according to claim 8, wherein the rubber hardness of the millable silicone rubber compound is from 5 to 40 lower than a rubber hardness of a base rubber excluding the millable silicone rubber compound and the thermally expandable microcapsule from the rubber composition.

10. A method of producing the rubber composition for a tire tread described in claim 9, the method comprising: preparing a master batch by mixing the millable silicone rubber compound and the thermally expandable microcapsule in advance, and mixing the master batch and the diene rubber.

11. The method of producing the rubber composition for a tire tread according to claim 10, wherein the master batch further contains a peroxide-based cross-linking agent.

12. A studless tire comprising a tread portion formed from the rubber composition for a tire tread described in claim 9.

13. The rubber composition for a tire tread according to claim 1, wherein the rubber composition is a studless tire tread rubber composition.

* * * * *